US011514253B2

(12) United States Patent
Szturo et al.

(10) Patent No.: US 11,514,253 B2
(45) Date of Patent: Nov. 29, 2022

(54) TRANSLATION PLATFORM FOR EXECUTABLE INSTRUCTIONS

(71) Applicant: Shopify Inc., Ottawa (CA)

(72) Inventors: Sebastian Szturo, Toronto (CA);
Christian Blais, Montréal (CA);
Thierry Joyal, Laval (CA)

(73) Assignee: Shopify Inc., Ottawa (CA)

( * ) Notice: Subject to any disclaimer, the term of this patent is extended or adjusted under 35 U.S.C. 154(b) by 774 days.

(21) Appl. No.: 16/408,075

(22) Filed: May 9, 2019

(65) Prior Publication Data

US 2020/0356635 A1    Nov. 12, 2020

(51) Int. Cl.
*G06F 40/58* (2020.01)
*G06F 8/71* (2018.01)
*G06F 8/36* (2018.01)

(52) U.S. Cl.
CPC ............. *G06F 40/58* (2020.01); *G06F 8/36* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 7,886,267 B2* | 2/2011 | Pratt | ............... | G06F 9/454 |
| | | | | 717/104 |
| 2005/0075858 A1* | 4/2005 | Pournasseh | ............ | G06F 40/58 |
| | | | | 704/2 |
| 2006/0271920 A1* | 11/2006 | Abouelsaadat | ........ | G06F 8/41 |
| | | | | 717/137 |
| 2008/0229289 A1* | 9/2008 | Nauman | ............... | H03M 7/30 |
| | | | | 717/136 |
| 2013/0151231 A1* | 6/2013 | Giraudy | ............... | G06F 40/58 |
| | | | | 704/2 |
| 2015/0254237 A1* | 9/2015 | Kraenzel | .............. | G06F 40/51 |
| | | | | 704/9 |
| 2018/0300218 A1* | 10/2018 | Lipka | .................... | G06F 40/40 |
| 2020/0356635 A1* | 11/2020 | Szturo | .................... | G06F 9/454 |

FOREIGN PATENT DOCUMENTS

| WO | WO2014204658 A1 * | 6/2013 |
|---|---|---|
| WO | 2014204658 A1 | 12/2014 |

OTHER PUBLICATIONS

Beesley, "Language Identifier: A Computer Program for Automatic Natural-Language Identification of Online Text", 1988, Proceedings of the 29th Annual Conference of the American Translators Association (Year: 1988).*

202024019321 , "Indian Application Serial No. 202024019321, Examination Report dated Jul. 29, 2021", Shopify Inc., 7 pages.

* cited by examiner

*Primary Examiner* — Hossain M Morshed

(74) *Attorney, Agent, or Firm* — Moffat & Co

(57) ABSTRACT

A computer-implemented method and system may include identifying an embedded human language string within a programming code based on a configuration file that specifies boundaries of the human language string within the programming code, communicating the identified embedded human language string for language translation from a first human language of the embedded human language string to a second human language to create a translated human language string, receiving the translated human language string, and inserting the translated human language string in the programming code to create a translated programming source code.

21 Claims, 6 Drawing Sheets

FIG. 2

TRANSLATION PLATFORM FOR EXECUTABLE INSTRUCTIONS

FIELD

The present disclosure relates generally to creating and editing computer executable instructions, and more particularly to translations of human language portions of computer executable instructions.

BACKGROUND

Computer executable instructions often have embedded human language content for display (such as to a user upon execution of the instructions) in a given language. As the extent of the executable instructions involved increases in size and complexity the translation burden on code developers and other users becomes significant. There is a need for automated systems to assist in translations of human language content embedded within computer executable instructions.

SUMMARY

In an aspect, a computer-implemented method may include identifying an embedded human language string within a programming source code based on a configuration file that specifies boundaries of the human language string within the programming source code; communicating the identified embedded human language string for language translation from a first human language of the embedded human language string to a second human language to create a translated human language string; receiving the translated human language string; and inserting the translated human language string in the programming source code to create a translated programming source code. In embodiments, the programming source code may be stored in a source code repository. The programming source code may be a master source code and the translated programming source code may be used to update the master source code. The programming source code may be a revision-controlled copy of a master source code. Identifying the embedded human language string may be initiated when the revision-controlled copy of a master source code is part of a request to update the master source code. Receiving the translated human language string may initiate a request to update the master source code. The embedded human language string may be communicated to a translation service provider. The method may further include checking for errors in the received translated human language string. The method may further include checking for errors in the translated programming source code. The programming source code may include the embedded human language string and a second embedded human language string where both of the embedded human language string and a second embedded human language string are identified within the programming source code. The embedded human language string and a second embedded human language string may be communicated together for translation. The embedded human language string and a second embedded human language string may be communicated separately for translation. Only the embedded human language string may be communicated for translation. Communicating the identified embedded human language string for language translation may communicate only a portion of the identified embedded human language string for translation. The method may further include preventing a change to the translated human language string after the translated human language string has been received, wherein preventing the change may be through a translation lock-out function. The first human language may be a default human language and an identification of the second human language may be communicated with the identified embedded human language string. The second human language may be a dialect of a human language. The method may further include a user interface displaying a function for communicating the embedded human language string for language translation and displaying an indication of completion when the translated human language string is received.

In an aspect, a computer-implemented method may include comparing a first version of a programming source code and a second version of a programming source code to identify a changed portion of the programming source code; identifying in the changed portion of the programming source code, an embedded human language string using a configuration file that specifies boundaries of the human language string within the programming source code; and communicating the identified embedded human language string for language translation. In embodiments, the language translation may translate from a first human language of the embedded human language string to a second human language to create a translated human language string. The method may further include receiving the translated human language string and inserting the translated human language string in the changed portion of the programming source code. Receiving the translated human language string may initiate a source code update request. The first human language may be a default human language and an identification of the second human language may be communicated with the identified embedded human language string. The second human language may be a dialect of a human language. Evaluating the changed portion of the programming source code may be initiated when the programming source code is part of a source code update request. The changed portion of the programming source code may include the embedded human language string and a second embedded human language string where both of the embedded human language string and a second embedded human language string are identified within the changed portion of the programming source code. The embedded human language string and a second embedded human language string may be communicated together for translation. The embedded human language string and a second embedded human language string may be communicated separately for translation. Only the embedded human language string may be communicated for language translation. Communicating the identified embedded human language string for language translation may only be a portion of the identified embedded human language string for language translation. The method may further include a user interface displaying a function for communicating the embedded human language string for language translation.

In an aspect, a computer-implemented method may include identifying an embedded human language string within an online page code, wherein identifying the embedded human language string based on a configuration file that specifies boundaries of the human language string within the online page code; communicating the identified embedded human language string for language translation from a first human language of the embedded human language string to a second human language to create a translated human language string; receiving the translated human language string; and inserting the translated human language string in the online page code to create a translated online page code. In embodiments, online page code may be associated with presentation of product related content in an online store. The online store may be hosted on an e-commerce platform. The online page code may include Hypertext Markup Language. The embedded human language string may be communicated to a translation service provider. The method may further include checking for errors in the received translated human language string. The method may further include checking for errors in the translated online page code. The online page code may include the embedded human language string and a second embedded human language string where both of the embedded human language string and a second embedded human language string are identified within the online page code. The embedded human language string and a second embedded human language string may be communicated together for translation. The embedded human language string and a second embedded human language string may be communicated separately for translation. Communicating the identified embedded human language string for language translation may only be a portion of the identified embedded human language string for translation. The method may further include preventing a change to the translated human language string after the translated human language string has been received, wherein preventing the change may be through a translation lock-out function. The first human language may be a default human language and an identification of the second human language may be communicated with the identified embedded human language string. The second human language may be a dialect of a human language. The method may further include a user interface displaying a function for communicating the embedded human language string for language translation and displaying an indication of completion when the translated human language string is received.

In an aspect, a system may include an e-commerce platform comprising at least one processor and at least one memory, the e-commerce platform adapted to: identify an embedded human language string within a programming source code based on a configuration file that specifies boundaries of the human language string within the programming source code; communicate the identified embedded human language string for language translation from a first human language of the embedded human language string to a second human language to create a translated human language string; receive the translated human language string; and insert the translated human language string in the programming source code to create a translated programming source code. In embodiments, the programming source code may be stored in a source code repository. The programming source code may be a master source code and the translated programming source code may be used to update the master source code. The programming source code may be a revision-controlled copy of a master source code. Identifying the embedded human language string may be initiated when the revision-controlled copy of a master source code is part of a request to update the master source code. Receiving the translated human language string may initiate a request to update the master source code. The embedded human language string may be communicated to a translation service provider. The system may further include checking for errors in the received translated human language string. The system may further include checking for errors in the translated programming source code. The programming source code may include the embedded human language string and a second embedded human language string where both of the embedded human language string and a second embedded human language string are identified within the programming source code. The embedded human language string and a second embedded human language string may be communicated together for translation. The embedded human language string and a second embedded human language string may be communicated separately for translation. Only the embedded human language string may be communicated for translation. Communicating the identified embedded human language string for language translation may communicate only a portion of the identified embedded human language string for translation. The system may further include preventing a change to the translated human language string after the translated human language string has been received, wherein preventing the change may be through a translation lock-out function. The first human language may be a default human language and an identification of the second human language may be communicated with the identified embedded human language string. The second human language may be a dialect of a human language. The system may further include a user interface displaying a function for communicating the embedded human language string for language translation and displaying an indication of completion when the translated human language string is received.

In an aspect, a system may include an e-commerce platform comprising at least one processor and at least one memory, the e-commerce platform adapted to: compare a first version of a programming source code and a second version of a programming source code to identify a changed portion of the programming source code; identify in the changed portion of the programming source code, an embedded human language string using a configuration file that specifies boundaries of the human language string within the programming source code; and communicate the identified embedded human language string for language translation. In embodiments, the language translation may translate from a first human language of the embedded human language string to a second human language to create a translated human language string. The system may further include receiving the translated human language string and inserting the translated human language string in the changed portion of the programming source code. Receiving the translated human language string may initiate a source code update request. The first human language may be a default human language and an identification of the second human language may be communicated with the identified embedded human language string. The second human language may be a dialect of a human language. Evaluating the changed portion of the programming source code may be initiated when the programming source code is part of a source code update request. The changed portion of the programming source code may include the embedded human language string and a second embedded human language string where both of the embedded human language string and a second embedded human language string are identified within the changed portion of the programming source code. The embedded human language string and a second embedded human language string may be communicated together for translation. The embedded human language string and a second embedded human language string may be communicated separately for translation. Only the embedded human language string may be communicated for language translation. Communicating the identified embedded human language string for language translation may only be a portion of the identified embedded human language string for language translation. The system may further include a user interface displaying a function for communicating the embedded human language string for language translation.

In an aspect, a system may include an e-commerce platform comprising at least one processor and at least one memory, the e-commerce platform adapted to: identify an embedded human language string within an online page code, wherein identifying the embedded human language string based on a configuration file that specifies boundaries of the human language string within the online page code; communicate the identified embedded human language string for language translation from a first human language of the embedded human language string to a second human language to create a translated human language string; receive the translated human language string; and insert the translated human language string in the online page code to create a translated online page code. In embodiments, online page code may be associated with presentation of product related content in an online store. The online store may be hosted on an e-commerce platform. The online page code may include Hypertext Markup Language. The embedded human language string may be communicated to a translation service provider. The system may further include checking for errors in the received translated human language string. The system may further include checking for errors in the translated online page code. The online page code may include the embedded human language string and a second embedded human language string where both of the embedded human language string and a second embedded human language string are identified within the online page code. The embedded human language string and a second embedded human language string may be communicated together for translation. The embedded human language string and a second embedded human language string may be communicated separately for translation. Communicating the identified embedded human language string for language translation may only be a portion of the identified embedded human language string for translation. The system may further include preventing a change to the translated human language string after the translated human language string has been received, wherein preventing the change may be through a translation lock-out function. The first human language may be a default human language and an identification of the second human language may be communicated with the identified embedded human language string. The second human language may be a dialect of a human language. The system may further include a user interface displaying a function for communicating the embedded human language string for language translation and displaying an indication of completion when the translated human language string is received.

BRIEF DESCRIPTION OF THE FIGURES

FIG. 2 depicts an embodiment of a home page of an administrator.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
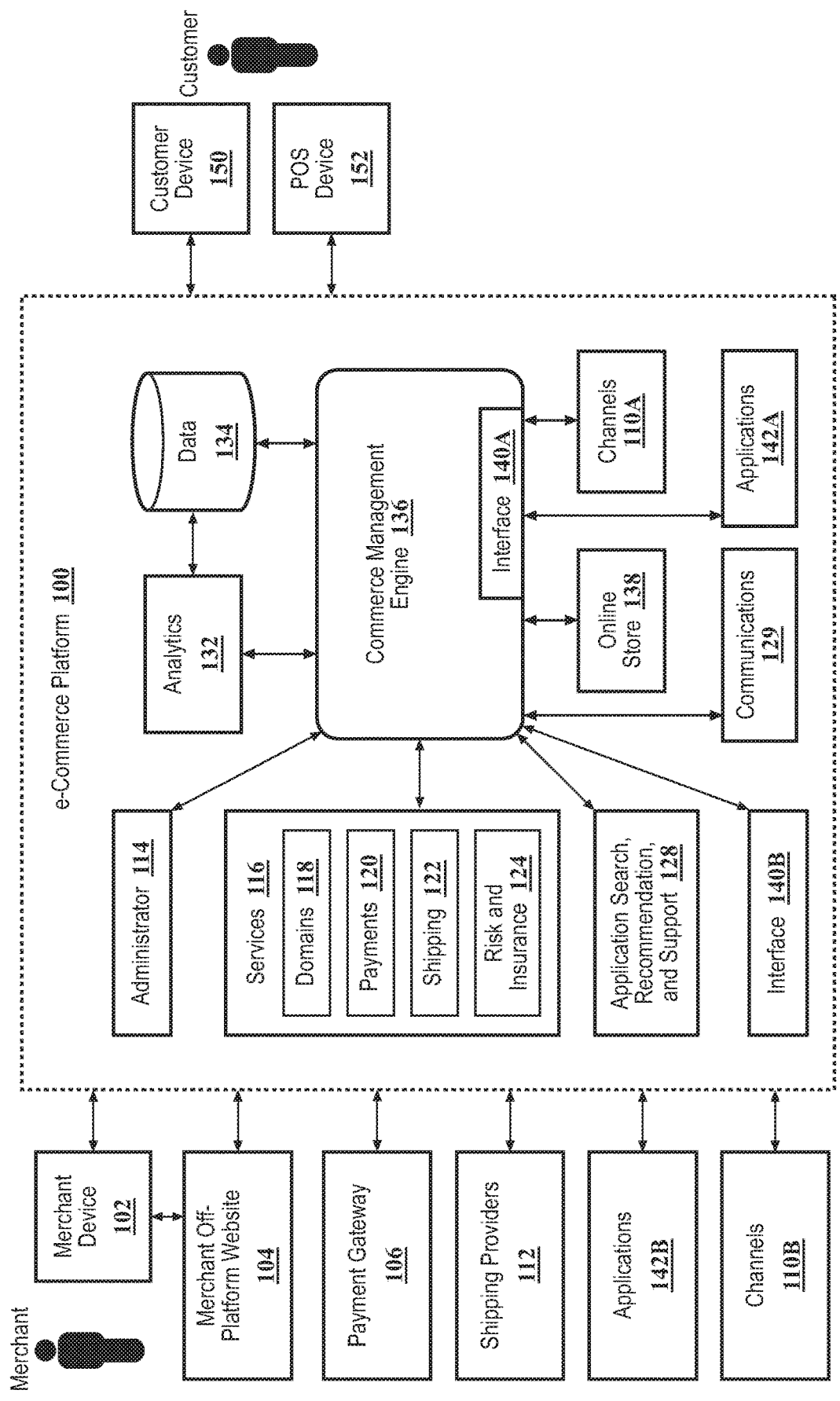
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
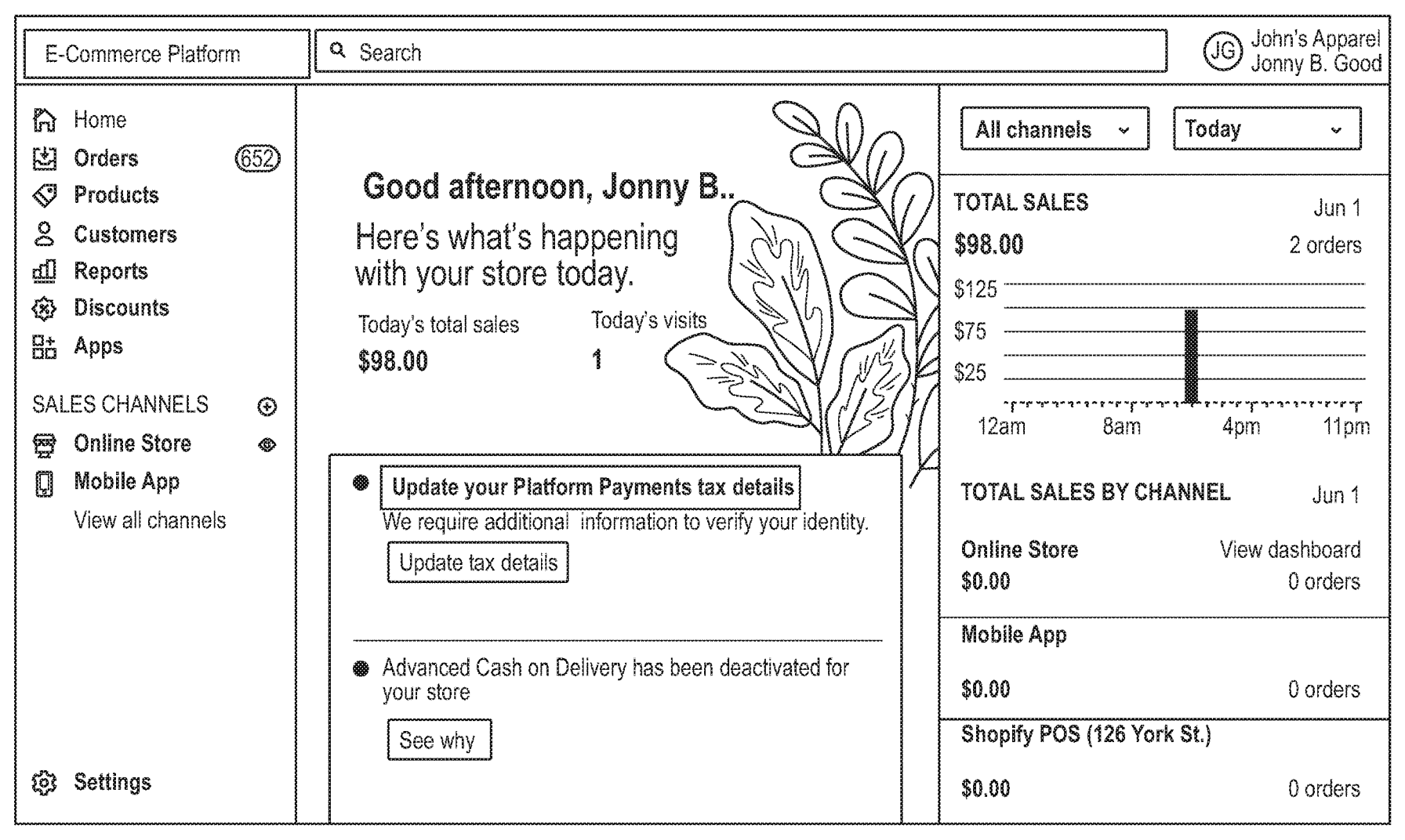

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide for translation services associated with users (such as merchants, developers and partners) creating and maintaining an online store presence in multiple languages. For instance, a merchant and/or developer may create customer facing online store pages or supporting applications for display in the English language but then want to transition the online store presence or applications into another language, and thus need to have the display content for the online store or application translated into that other language. Alternately, the merchant or developer may already have an online store or application that supports multiple languages but in the process of making changes to scripts or code in the English language has to have displayed portions of the new scripts or code translated to those other languages. In this instance, the e-commerce platform 100 may provide for translation services to help users support multiple languages.

Figure 3:
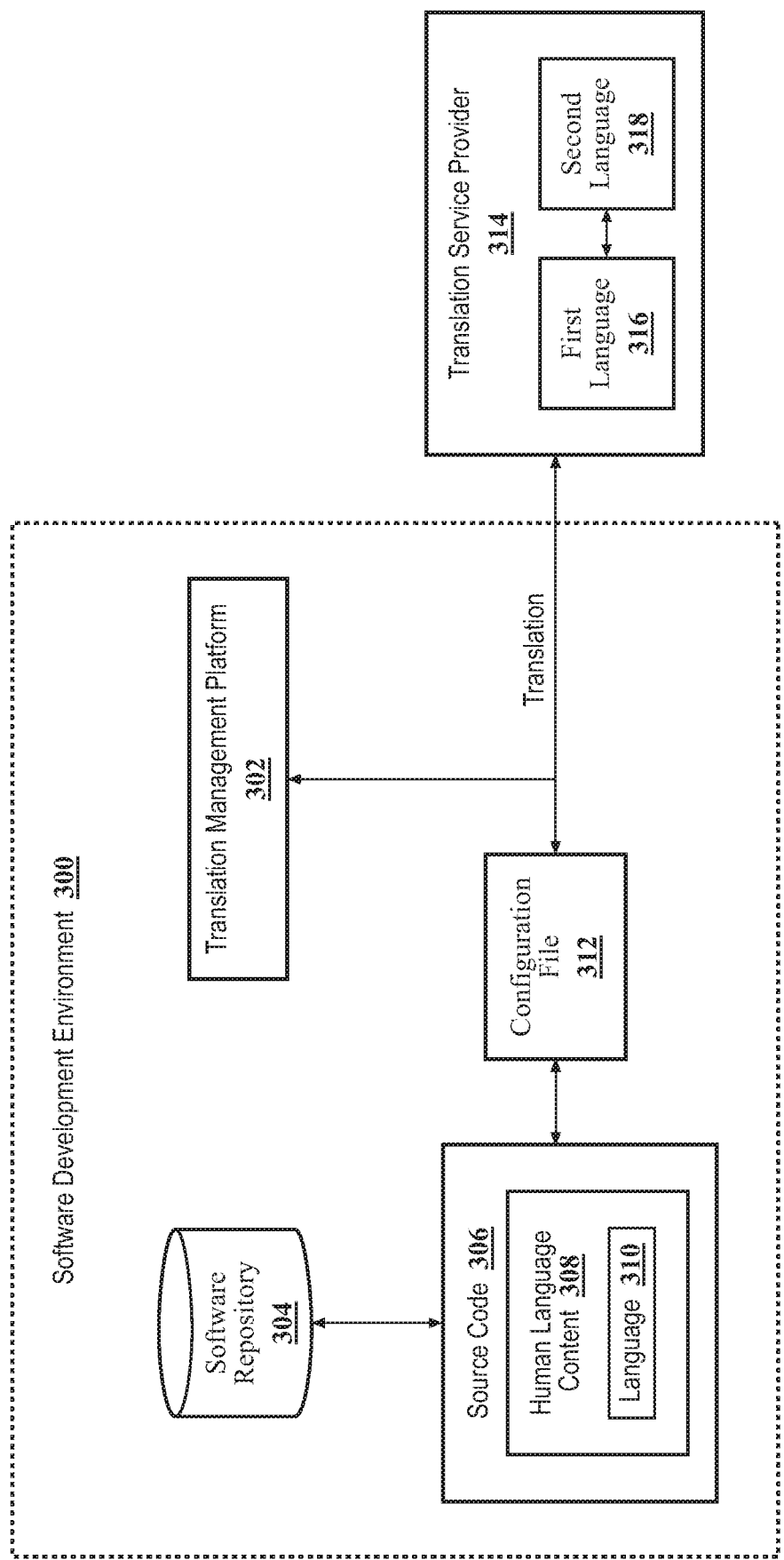
FIG. 3 depicts an embodiment functional block diagram for a translation management platform interacting within a software development environment.

Referring to FIG. 3, the e-commerce platform 100 may include a translation management platform 302 to provide automated language translation management functions associated with the translation of human language content 308 embedded within computer executable instructions. For instance, a computer executable instruction written in JavaScript to display or utter the word 'hello' to a viewer (such as a user of the computing device executing the instructions) may be written as "alert (hello);", where the word 'hello' is the human language content 308 embedded within the display command 'alert ( )'. The embedded human language content 308 may be blocks of descriptive language (e.g., a product description on an online store), strings of words (e.g., "Hello, welcome to our store"), single words embedded within command instructions, or any portion or portions of human language embedded in executable instructions meant to be displayed or uttered to a user. For instance, the following computer executable instruction has a combination of instruction code and human language content 308:

<p>
Hello Mr. Jones, you have <% if number_of_orders==1%> a new order <% else %>
<%=number_of_orders %> new orders <% end %> since <%=time_ago_in_words(timestamp)
%>
</p>

The translation management platform 302 may monitor for changes in computer executable instructions (e.g., a user making changes), identify human language content 308, and communicate the human language content 308 to a translation service provider 314, such as for translating from a first language 316 to a second language 318. The first and second language may be any human language or dialect, such as English, French, Mandarin Chinese, Hindustani, Spanish, Arabic, Italian, Portuguese, Portuguese-Brazil, Danish, Dutch, and the like. For instance, a user generating executable instructions may be a native English speaker, and so writes the human language content 308 portions of the computer executable instruction in English. But the online store may also support French language customers, and so any embedded human language content 308 generated by the user would need to be translated into French for the version of the executable instructions running for French language customers.

Although computer executable instructions may also be referred to as programming source code 306 or online page code 404 in embodiments herein, such as for the development of executable instructions in support of the online store, applications, service functions, and the like, one skilled in the art will appreciate that computer executable instructions may refer to any software, including object code, binary code, source code, firmware, microcode, libraries, routines, subroutines, programs, libraries, drivers, header files, APIs, scripts or other code, and including commercial, open source and freeware software, and any other material related to such software, including documentation, comments and specifications, and any derivative of any of the foregoing. The translation management platform 302 may support a variety of different executable instruction formats (e.g., .yaml, .json, .html, .xml, strings and the like). Computer executable instructions may be programmed by users but may also be autogenerated by the actions of a user, such as where the user does not have to manually write the lines of code (e.g., through a user interface that is "what you see is what you get" (WYSIWYG) that creates the underlying code, through an integrated development environment or through a code generator). Generally, computer executable instructions may be any organized list of instructions that, when executed, causes the computer to behave in a predetermined manner. In embodiments, the computer executable instructions may be in any format, such as script format (such as with embedded human language content 308) where there is no distinction between source or object code.

In embodiments, computer executable instructions may be source code 306 developed within a software development environment 300, where the source code 306 may have embedded human language content 308 written in a language 310 (such as that of the user writing the source code 306), which may need to be translated to another language. In embodiments, the translation management platform 302 may be within or outside of the software development environment 300. The need for translation may be due to the source code 306 being meant to be executed for viewing in a different language than it was written (e.g., the coder-user is a native English speaker but the source code 306 is meant to be viewed by French speakers), the source code 306 needs to be translated for versions that execute in multiple languages, and the like. Since only the embedded human language content 308 needs to be translated (not the instructional language of the source code 306), the boundaries separating the human language content 308 from the source code 306 instructions need to be identified and this information may be stored in a configuration file 312.

The configuration file 312 may be generated by the translation management platform 302 through evaluating the source code 306 based on the known source code language structure. A source code language may be well defined in content, structure, and syntax, and so the translation management platform 302 may parse the source code 306, determine the boundaries between the human language content 308 from the instructions of source code 306, and store this information in the configuration file 312. Alternately, the user generating the source code 306 (or other individual) may identify these boundaries as input to, or to create, the configuration file 312 for the translation management platform 302 to use in separating the human language content 308 for translating. The process for creating the configuration file 312 may also be a combination of automated and user-driven processes. The boundaries may be identified as lines and ranges of characters, by markers inserted in the code and the like. In embodiments, a configuration file 312 may change over time.

The translation management platform 302 may then identify the embedded human language string(s) within the programming source code 306 based on the configuration file 312 that specifies boundaries of the human language string(s) within the programming source code 306 and communicate the identified embedded human language string(s) for language translation by the translation service provider 314.

In embodiments, the process of specifying human language content 308 within programming source code 306 may utilize identifiers or 'handles' that specify human language content 308 for translation, such as to break the translation associated with a larger body of source code 306 into smaller more manageable portions. For example, the following identifies a 'greeting' associated with the example computer executable instruction that includes human language content 308:

```
<p>
  I18n.translate('greeting',
    name: "Mr. Jones", count: number_of_orders, time_ago:
      I18n.localize(timestamp))
</p>
```
Identifiers may then be used to generate externalized strings to be used in translations, such as for the original language (e.g., English) and for the corresponding translations (e.g., French and German), as in the following:
English:
greeting:
one: "Hello %{name}, you have a new order since %{time_ago} !"
other: "Hello %{name}, you have %{count} new orders since %{time_ago} !"
French:
greeting:
one: "Vous avez %{count} vente depuis %{time_ago}, %{name}!"
other: "Vous avez %{count} ventes depuis %{time_ago}, %{name}!"
German:
greeting:
one: "Hallo %{name}, Sie haben eine neue Bestellung seit %{time_ago} !"
other: "Hallo %{name}, Sie haben %{count} neue Bestellungen seit {% time_ago} !"

In embodiments, the translation management platform 302 may utilize the configuration files 312 to monitor changes to the source code 306 to determine when translations are needed. For instance, once a configuration file 312 is established the translation management platform 302 knows which source code files to watch and where to watch for changes that would lead to the need for translations, and as such could alert the user making changes to the source code 306, such as through a user interface, a dialog box, a notification, and the like. Alternately the translation management platform 302 may set a notification for the user when they have completed changes to the source code 306, such as at a time when the user makes a request to merge a change to the source code 306 into a master source code. Although typically translators only receive the human language content to translate, in embodiments, the configuration file 312 may identify translation tasks that involve a mixture of instruction code and human language content 308.

The translation service provider 314 then translates from a first human language 316 of the embedded human language string(s) to a second human language 318 to create translated human language string(s). Once complete, the translation service provider 314 may then communicate the translated human language string(s) to the translation management platform 302. At this point, the translation management platform 302 may use the configuration file 312 to replace the original embedded human language string(s) or otherwise insert the translated human language string(s) in the programming source code 306 to create a translated programming source code 306.

In embodiments, the process of identifying and communicating the human language content 308 to the translation service provider 314 may include one or more human language content 308 portions. For instance, the translation management platform 302 may identify multiple human language content 308 portions within the source code 306 and send them all to the translation service provider 314 at once, identify multiple human language content 308 portions within the source code 306 and send them to the translation service provider 314 individually, identify multiple human language content 308 portions within the source code 306 and selectively send them to the translation service provider 314, send only a subset of a string (for example only the portion of the string that changed, possibly with some additional surrounding text for context) and the like. In embodiments, the translation management platform 302 may manage the translation process through the translation service provider 314 to increase efficiency, such as based on past performance of the translation service provider 314 (e.g., sending human language content portions separately or together based on past error rates detected in delivered translation products).

In embodiments, the translation management platform 302 may use a configuration file 312 and components to manage the translation needs of a source code 306, enabling the translation management platform 302 to monitor and manage the desired translations as applicable changes to the code are identified (i.e., code changes with embedded human language content 308 that need translation). In embodiments, components may provide a logical segmentation of files under translation management, such as to group files so the translation management platform 302 can perform operations on the group. Such segmentation may aid in translation priority, quality assurance, allow for specific configuration options to be applied to a set of files, and the like. For instance the system may want to translate two components into two distinct sets of languages.

In an example, a configuration file 312 may be as follows, which specifies a source language as English; the target languages for translation as German, Spanish, French, Italian, Japanese, and Brazilian Portuguese; and the name and the path for the file of the source code 306 to be monitored.
Source language: en
Target languages: [de, es, fr, it, ja, pt-BR]
Components:
  Name: merchant
  Paths:
    Config/locales/**/{{language} }.yml
This configuration file 312 may then enable the translation management platform 302 to watch for changes to the source code 306 in the component path and communicate changes to the translation management platform 302, such as with the following format:
  Config/locales/home/en.yml
  Config/locales/payments/en.yml
In embodiments, the translation management platform 302 may then create a request with new translation files as soon as translations are ready and approved, such as for example the Japanese translation:
  Config/locales/home/ja.yml
  Config/locales/payments/ja.yml
In embodiments, the software development environment 300 may be a shared software development environment 300, such as in a shared repository model where the source code 306 is stored in a software repository 304 (such as GITHUB). Further, the shared software development environment 300 may include revision control functionality, such as for maintaining a master source code and one or more branch copies of the master source code that are controlled versions with respect to merging changes with the master source code. For instance, a branch copy may require a request for merging the branch copy with the master source code, which is sometimes referred to as a 'pull request' because the user is requesting the software repository 304 to pull the branch version into the master source code (such as to replace or change a portion of the master source code). In a shared software development environment 300, the need for translation may be triggered differently dependent upon whether the source code 306 is a master source code or a branched source code, on a priority indication with respect to the time-criticality for incorporating a change to the source code 306, and the like. For instance, a master source code may immediately incorporate changes made and so translations may be triggered at the time the change is implemented, but a translation associated with a branched source code may be triggered when the user submits a request to merge a change with the master (e.g., in a pull request). As a result, translations may lag behind the implementation of a change to a master source code, which then may result in an end-user experiencing a mixed language experience (e.g., some text in their desired language and some in English). Translations in a source code branch may be more controlled in that the implementation of code changes can be delayed until the translations are fully implemented, thus avoiding a mixed language user experience. In embodiments, functionality and processes associated with the translation management platform 302 and/or the software development environment 300 may be exposed using an application programming interface (API).

In embodiments, the translation management platform 302 may implement the process for translations in a workflow that is familiar to users, such as when a user is accustomed to working in a shared software development environment 300, working on online store page development, and the like. For instance, when a user is accustomed to working in a shared software development environment 300 the user may regularly work with the workflows associated with the immediate changes to master source code and the pull request controlled changes to branched source code. It may be familiar to a user to have code changes, comments and related translations contained in a pull request.

In a shared software development environment 300, a master workflow may be associated with content being directly interacted with from the master branch of a source code 306 from the software repository 304. This workflow may be performed at any time a set of tentative source code changes meant to be made permanent (also sometimes referred to as 'commits') are added to the master source code without the need of any user action. In this instance, the workflow first determines if changes have been made to the source code 306 (e.g., using native functionality of software repository, such as flagging changed files or allowing for file comparisons or diffs), and if so, the translation management platform 302 determines if and where the changes include human language content 308 (e.g., through the use of configuration files 312). When the changes being merged to the master branch contain human language content 308 the translation management platform 302 sends those portions for translation (e.g., to be merged later).

In embodiments, the translation management platform 302 may communicate all strings with changes or may communicate a more focused subset of the changed content requiring translation. Translation requests may be communicated on a continuous basis or may be communicated in periodic batches. In a master branch workflow, the source code 306 changes may typically be implemented before translations are complete, so a higher priority may be assigned to translations when the job is sent to the translation service provider 314. When translations are complete, the translation management platform 302 may receive a notification that the translated content has been sent or is ready for pick-up. In embodiments, once translations are completed they may be appended to an existing pull request or a new pull request created on the shared software development environment 300, such as with respect to retrieving the new translations and merging updated source code 306 with translations. These pull requests may be merged by users as soon as possible to eliminate any mixed language experience, as well as to reduce the potential for merge conflicts due to the delay. In embodiments (including any of those described herein), the process of receiving the translated content may include a quality control check (e.g., error evaluation) for the translation results. For instance, a check may be made for missing strings, check for symbols which may not have been translated correctly, and the like. The quality control check may also correct for instances where the translator may have been provided with minimal context (e.g., short strings of words that may have multiple meanings depending on the context).

In a shared software development environment 300, the branch workflow involves content being interacted with a branched version of the master source code of the software repository 304. The workflow associated with translations is similar to the master workflow except that the triggering event for translations may be a user indicating that content is ready for translation or when a pull request is created that is associated with a change to the source code 306. The branch workflow may be performed within the scope of a pull request in isolation, where as long as that pull request is not merged, the content will not propagate to the master (or other branches). In embodiments, this workflow may require manual interaction through the pull request in order to send the content for translations or the platform may automatically detect a need for translations such as based on user activity. In embodiments, this process may be automated with the exception of the initial request, such as to ensure the translation management platform 302 does not request translations for code changes that are still in progress. When a pull request is made, the translation management platform 302 may scan, compare and/or review the source code 306 and determine if translations are needed. For pull requests which do not contain any files needing translations, the check may not need to be associated with the pull request.

In embodiments, when changes to the source code 306 do include the need for translations, a series of checks may be initiated to validate the configurations and assist in the translation process. The translation management platform 302 may provide notification that some of the changes are subject to extra validations, such as a project configuration and state needing to be re-validated to ensure integrity before moving to the translation phase. If an error is detected an indicator may be provided to allow a user to review more detail of any specific problem, and actions may be identified that need to be addressed. Once the configuration and project state have been validated, translations may become available. A user may then select request translations, such as through a translation management user interface, where the translation management platform 302 sends the content for translation and where the corresponding pull request transitions to a pending state while waiting for the translations to come back. Once the translation is complete, new commits may be automatically added to the pull request or the translations may be added to the pull request and, in embodiments, associated comments may be added providing additional detail regarding the translations.

In embodiments, there may be additional steps for obtaining confirmation that content is ready for translation in order to avoid translations for work that is still in progress, such as by prompting a user for input. In embodiments, with the branched workflow being related to pull requests in the shared software development environment 300, the translation management platform 302 may provide interactions with users through a pull request view that provides users with a pull request format and process that is familiar to the user from past work with the shared software development environment 300. This may allow a user to view the original content, changes and translated content, along with any comments or explanations in the familiar format, allowing for quickly understanding why the translation was made, what triggered it, and what the next steps are.

In embodiments, further functions associated with translations may include translation lock-out functionality used to prevent changes to translations except as provided by the translation management platform 302. The lock-out function may maintain quality control of the translation process, preventing for instance a user (possibly with poor language translation skills) from modifying the translation as provided by the translation service provider 314 (and potentially also approved by the translation management platform 302). Lock-out functionality may also be applied specific to certain content, such as legal content that needs to be either left in the language provided by legal counsel or provided by certain translators specializing in legal language.

In embodiments, further functions associated with translations may include override functionality for situations were committing the source code 306 may be more important than completing the translations. This may result in the translations being completed asynchronously from the source code 306 commit and may result in a mixed language experience where only certain content is available in the language(s) to which the base content is to be translated. In embodiments, configuration errors may not be allowed to be bypassed as these may be tied to the project integrity and not considered optional.

Figure 4:
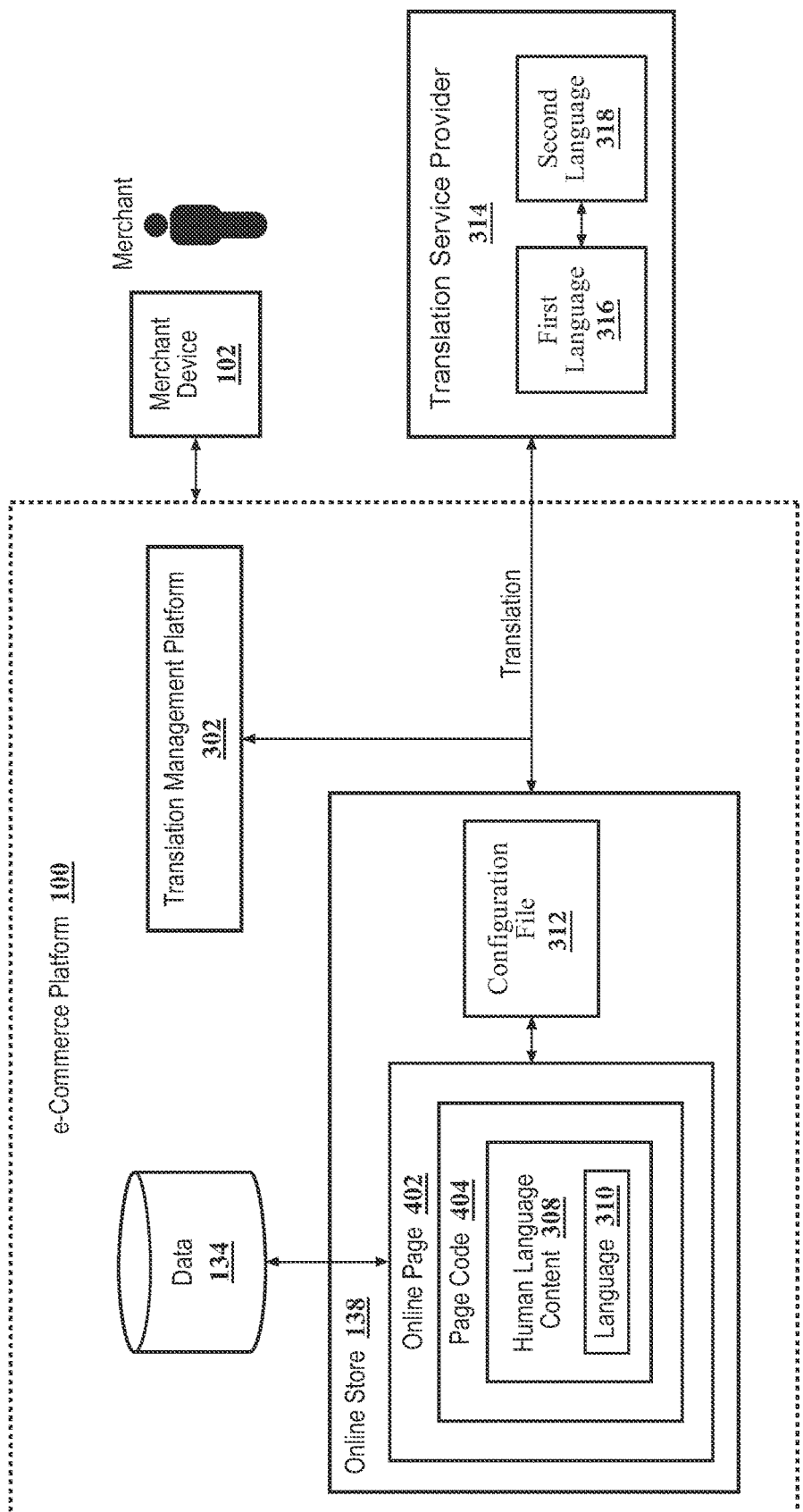
FIG. 4 depicts an embodiment for functional block diagram for a translation management platform interacting within an e-commerce platform.

Referring to FIG. 4, the e-commerce platform 100 may include a translation management platform 302 to provide automated language translation management functions associated with the translation of human language content 308 embedded within computer executable instructions related to the development of content, such as content included in or to be included in online pages 402 of an online store 138. As disclosed herein, identification of human language content 308 embedded in computer executable instructions as page code 404 that needs translation (e.g., in new or modified sections of an online page) may be implemented through configuration files 312 and the like. The translation management platform 302 may monitor online page code 404 and notify the user that translations may be needed as a result of changes the user has made or is in the process of making. Configuration files 312 may be used to identify the boundaries between the instruction portion of the page code 404 from the human language content 308. In embodiments, the translation management platform 302 may provide for a user interface (e.g., through a home page, admin page, and the like) that may allow for some settings to be set globally or applied generally to a subset of pages 402 or sections of pages, such as the languages to translate into and the categories of content to translate (e.g., translate product pages, but do not translate FAQ pages and reviews). A user (such as a merchant or partner) may be given control over the process and may be prompted for input (e.g., with respect to what content is sent for translation, ability to specify budgets for translations, and the like). In embodiments, the translation management platform 302 may allow for draft functionality, such as allowing for translations to be performed before the page code changes are made live (such as to customers), including a place to store draft content before it is sent for translation, and the like. The translation management platform 302 may also allow the user to specify a particular translating service, a translation budget, a timeframe for performing the translation, and the like.

Figure 5:
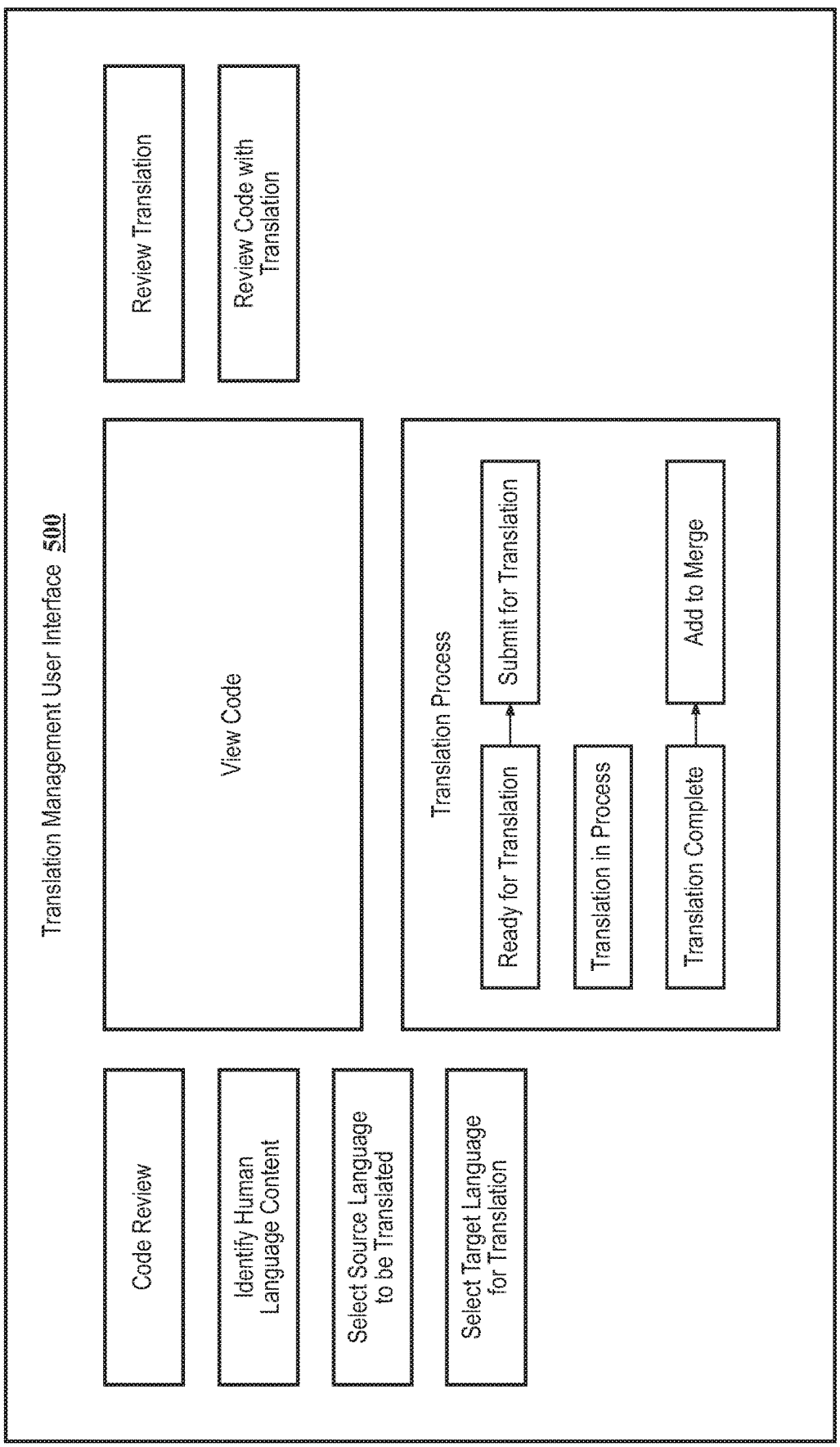
FIG. 5 depicts an embodiment for a translation management user interface.

Referring to FIG. 5, in embodiments the translation management platform 302 may provide a translation management user interface 500 associated with translations associated with changes to computer executable instructions, such as when a user is making changes to source code 306 in association with a software development environment 300, changes to online store page code 404 (such as using a WYSIWYG editor) in association with modifications to product presentation to customers through the online store 138, and the like. In embodiments, the translation management user interface 500 may be customized to a view and interactive experience with the user to match the software development environment 300 the user is accustomed to working in.

Figure 6:
FIG. 6 depicts an embodiment of a request sequence through a translation management user interface.

In an example, a developer working in a shared software development environment 300 may be accustomed to viewing workflow process through the framework of a pull request, where the translation management user interface 500 messages, alerts, notifications, actions, and the like, are presented in a similar manner to those of a pull request. In embodiments, the translation management user interface 500 may integrate with native pull request functionality of the shared software development environment 300. For instance, with reference to FIG. 6, the translation management platform 302 may monitor the need for translations of a branched version of source code 306 through a graphical user interface depicting a branch request sequence, such as utilizing a configuration file 312 associated with a source file the user is working with, the translation management user interface 500 may display "ready to translate?" as a result of changes made during a branched workflow. This message may be displayed in association with a pull request that is associated with strings in defined translation components. The user may continue to work on the source code 306 until ready for translation, at which point the user may click or select a "submit for translation" display button or menu item. In embodiments, the translation management platform 302 may monitor the branched source code and push updates to the translation service provider 314 (e.g., where changed or added strings are pushed to be translated). Once translations are underway, the translation management user interface 500 may display a notification such as "translations are in progress", where changes to the source file (e.g., in English) are sent for translation and changes into the target language translation files (e.g., French, German, Japanese and the like) are communicated back to the translation management platform 302. The translation management platform 302 may then add a commit to the branched process for each target language translation, such as through an "add to merge queue" display button. An indication may be displayed that "translation is completed", which may show up as soon as all the target language translation files are on the branch. In embodiments, the translation management platform 302 may delete the branch specific file as soon as the pull request is merged or closed. Although this example is a non-limiting example, one skilled in the art will appreciate from it how a translation process may be integrated into a branched workflow of a shared software development environment 300.

In another example with respect to the translation management user interface 500, a user may be a merchant or partner working to develop online store content for an online store 138, where the translation management user interface 500 may present messages, alerts, notifications, actions, and the like, in a similar format or integrated with user interfaces familiar to the user. In embodiments, the translation management user interface 500 may include functions to initiate a code review, identify human language content 308, select a source language for translation, select a target language for translation, submit for translation, review translation, review code with translation, merge translated code, and the like. The translation management user interface 500 may provide for views of the code, views of the translated results, and the like. Similar process and display steps as in the example of the branched pull request interface may also apply to a merchant and/or partner interface for an online store 138, where displays of "ready to translate?", "submit for translation", "translation in progress", "translation completed", and "add to merge" may be provided as part of the creation or editing process associated with online store page code 404.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
identifying an embedded human language string within a programming source code based on a configuration file that specifies boundaries of the embedded human language string within the programming source code, wherein the programming source code is stored in a source code repository, and wherein the programming source code is a revision-controlled copy of a master source code;
wherein identifying the embedded human language string is initiated when the revision-controlled copy of a master source code is part of a request to update the master source code;
communicating the embedded human language string for language translation from a first human language of the embedded human language string to a second human language to create a translated human language string, wherein only the embedded human language string is communicated for translation;
receiving the translated human language string; and
inserting the translated human language string in the programming source code to create a translated programming source code;
wherein the configuration file specifies boundaries of the embedded human language string with line and character numbers.

2. The computer-implemented method of claim 1, wherein the programming source code is a master source code and the translated programming source code is used to update the master source code.

3. The computer-implemented method of claim 1, wherein receiving the translated human language string initiates a request to update the master source code.

4. The computer-implemented method of claim 1, wherein the programming source code comprises the embedded human language string and a second embedded human language string where both of the embedded human language string and a second embedded human language string are identified within the programming source code.

5. The computer-implemented method of claim 1, wherein communicating the embedded human language string for language translation communicates only a portion of the embedded human language string for language translation.

6. The computer-implemented method of claim 1, further comprising a user interface displaying a function for communicating the embedded human language string for language translation and displaying an indication of completion when the translated human language string is received.

7. A computer-implemented method comprising:
comparing a first version of a master programming source code stored in a revision controlled source code repository and a second version of the master programming source code stored in the revision controlled source code repository to identify a changed portion of the master programming source code;
identifying in the changed portion of the programming source code, an embedded human language string using a configuration file that specifies boundaries of the embedded human language string within the programming source code, wherein the identifying the embedded human language string is initiated in response to a request to update the master programming source code; and
communicating the embedded human language string for language translation;
wherein the configuration file specifies boundaries of the embedded human language string with line and character numbers.

8. The computer-implemented method of claim 7, wherein the language translation translates from a first human language of the embedded human language string to a second human language to create a translated human language string.

9. The computer-implemented method of claim 8, further comprising receiving the translated human language string and inserting the translated human language string in the changed portion of the master programming source code.

10. The computer-implemented method of claim 7, further comprising a user interface displaying a function for communicating the embedded human language string for language translation.

11. A computer-implemented method comprising:
identifying an embedded human language string within an online page code, wherein identifying the embedded human language string is based on a configuration file that specifies boundaries of the embedded human language string within the online page code, wherein the online page code is stored in a content management system, and wherein the identifying is initiated in response to a request to update the online page code in the content management system;
communicating the embedded human language string for language translation from a first human language of the embedded human language string to a second human language to create a translated human language string;
receiving the translated human language string; and
inserting the translated human language string in the online page code to create a translated online page code;
wherein the configuration file specifies boundaries of the embedded human language string with line and character numbers.

12. The computer-implemented method of claim 11, wherein the online page code is associated with presentation of product related content in an online store.

13. The computer-implemented method of claim 12, wherein the online store is hosted on an e-commerce platform.

14. The computer-implemented method of claim 11, further comprising checking for errors in the translated online page code.

15. The computer-implemented method of claim 11, further comprising preventing a change to the translated human language string after the translated human language string has been received, wherein preventing the change is through a translation lock-out function.

16. The computer-implemented method of claim 11, further comprising a user interface displaying a function for communicating the embedded human language string for language translation and displaying an indication of completion when the translated human language string is received.

17. A system comprising:
an e-commerce platform comprising at least one processor and at least one memory, the e-commerce platform adapted to:
compare a first version of a programming source code and a second version of the programming source code to identify a changed portion of the programming source code;
identify in the changed portion of the programming source code, an embedded human language string using a configuration file that specifies boundaries of the embedded human language string within the programming source code; and
communicate the embedded human language string for language translation, wherein the language translation translated from a first human language of the embedded language string to a second human language to create a translated human language string; and
receive the translated human language string, and insert the translated human language string in the changed portion of the programming code, wherein receiving the translated human language string initiates a source code update request;
wherein the configuration file specifies boundaries of the embedded human language string with line and character numbers.

18. The system of claim 17, wherein the first human language is a default human language and an identification of the second human language is communicated with the identified embedded human language string.

19. The system of claim 17, wherein the changed portion of the programming source code comprises the embedded human language string and a second embedded human language string where both of the embedded human language string and the second embedded human language string are identified within the changed portion of the programming source code.

20. The system of claim 17, wherein communicating the embedded human language string for language translation communicates only a portion of the embedded human language string for language translation.

21. The system of claim 17, further comprising a user interface displaying a function for communicating the embedded human language string for language translation.

* * * * *